US009332737B2

(12) United States Patent
Vaughn, Jr. et al.

(10) Patent No.: US 9,332,737 B2
(45) Date of Patent: May 10, 2016

(54) FINCH BIRD FEEDER WITH ADJUSTABLE PORT ACCESS

(71) Applicant: Woodstream Corporation, Lititz, PA (US)

(72) Inventors: William Ray Vaughn, Jr., Lititz, PA (US); Judith Kim Hoysak, Lancaster, PA (US)

(73) Assignee: WOODSTREAM CORPORATION, Lititz, PA (US)

( * ) Notice: Subject to any disclaimer, the term of this patent is extended or adjusted under 35 U.S.C. 154(b) by 0 days.

(21) Appl. No.: 14/485,141

(22) Filed: Sep. 12, 2014

(65) Prior Publication Data
US 2016/0007573 A1  Jan. 14, 2016

Related U.S. Application Data

(63) Continuation-in-part of application No. 13/619,008, filed on Sep. 14, 2012, now abandoned.

(51) Int. Cl.
*A01K 39/01*  (2006.01)

(52) U.S. Cl.
CPC .................................. *A01K 39/01* (2013.01)

(58) Field of Classification Search
CPC ........................... A01K 39/01; A01K 39/0113
USPC ................ 244/119, 52.2, 52.3, 57.8, 57.9, 72
See application file for complete search history.

(56) References Cited

U.S. PATENT DOCUMENTS

| 4,188,913 | A | * | 2/1980 | Earl et al. ...................... 119/57.9 |
| 4,996,947 | A | * | 3/1991 | Petrides ....................... 119/57.9 |
| 5,235,935 | A | * | 8/1993 | Edwards ...................... 119/57.8 |
| 5,758,596 | A | * | 6/1998 | Loiselle ....................... 119/52.2 |
| 5,826,540 | A | * | 10/1998 | Bridges ....................... 119/52.3 |
| 7,921,809 | B2 | * | 4/2011 | Hunter et al. ................ 119/57.8 |
| 8,833,301 | B2 | * | 9/2014 | Donegan et al. ............. 119/57.8 |
| 2006/0112892 | A1 | * | 6/2006 | Hunter et al. ................ 119/57.8 |
| 2006/0266295 | A1 | * | 11/2006 | McDarren .................... 119/57.8 |
| 2011/0226186 | A1 | * | 9/2011 | Hunter et al. ................ 119/52.2 |
| 2012/0234249 | A1 | * | 9/2012 | Gaze ............................ 119/57.8 |

* cited by examiner

*Primary Examiner* — Monica Williams
*Assistant Examiner* — Michael Wang
(74) *Attorney, Agent, or Firm* — Jacobson Holman, PLLC.

(57) ABSTRACT

A bird feeder is provided having adjustable port access. The feeder includes a seed reservoir with a side wall that has at least one seed access opening and an adjustable feed port element. According to one embodiment, the adjustable feed port element is a feed port assembly. The feed port assembly includes a base with a rotatable insert having a perch coupled thereto in fixed relationship so that the perch and insert rotate as a unit. According to another embodiment, the adjustable feed port element rotates around the perch between a first position in which the perch is below a feed port being accessed, enabling birds to feed while standing on the perch, and a second position in which the perch is above a feed port being accessed, requiring birds to hang upside down from the perch to feed.

11 Claims, 18 Drawing Sheets

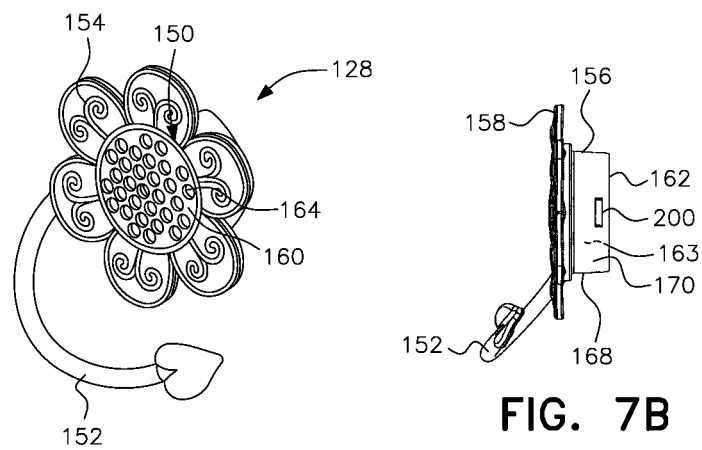
FIG. 7A
FIG. 7B
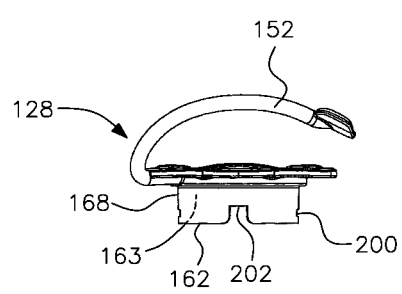
FIG. 7C
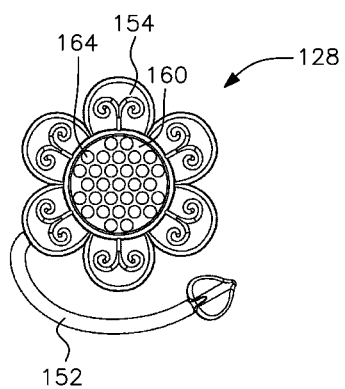
FIG. 7D

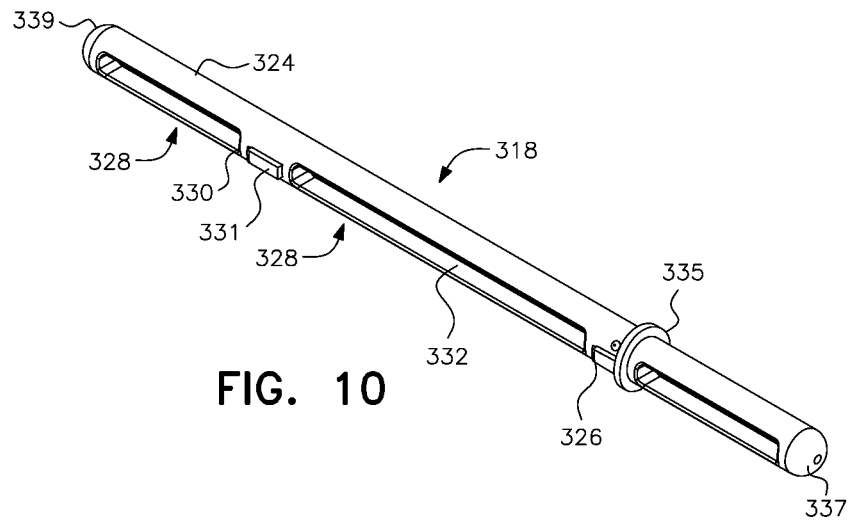
FIG. 10
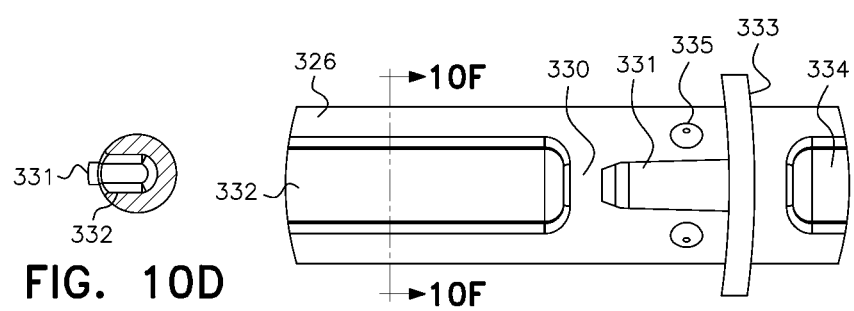
FIG. 10D
FIG. 10E
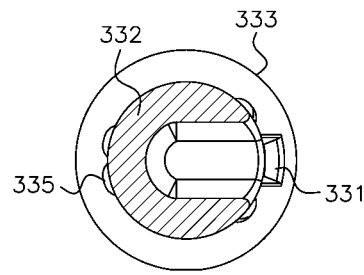
FIG. 10F
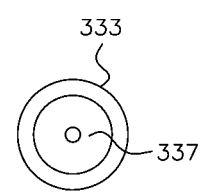
FIG. 10G

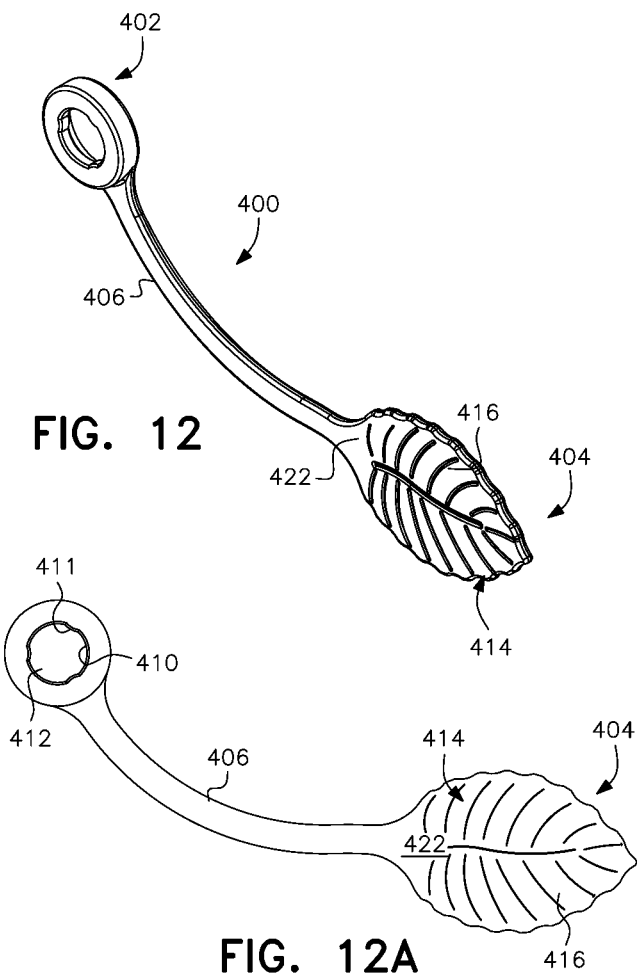
FIG. 12
FIG. 12A
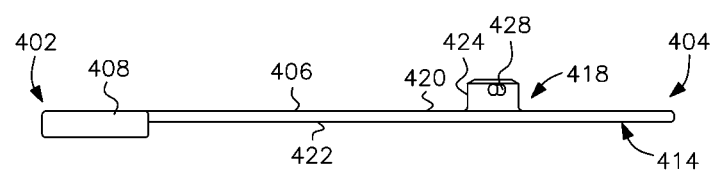
FIG. 12B

FINCH BIRD FEEDER WITH ADJUSTABLE PORT ACCESS

This application is a continuation-in-part application of co-pending application Ser. No. 13/619,008, filed Sep. 14, 2012, and hereby claims the priority thereof to which it is entitled.

FIELD OF THE INVENTION

The present invention generally relates to bird feeders for attracting and feeding wild birds, especially finches. More particularly, the present invention is directed to bird feeders configured to provide adjustable access to feed ports.

BACKGROUND OF THE INVENTION

Persons have long used bird feeders, birdbaths, and the like to attract birds of various types to their homes, both to view the birds and to feed the birds out of concern for their welfare in the event that food is scarce, as in winter. Different types of feeders have been developed, which each dispense foodstuffs that are preferred by a selected variety of bird that a person might desire to attract. For example, seeds, grains, suets, and nectars are common foodstuffs that can be dispensed by a selected type of feeder.

Seed dispensing birdfeeders are perhaps the easiest and most popular way of attracting a myriad of wild birds to a particular location for viewing. This is especially so in the winter months when food is scarce. Typically, seed feeders are suspended from or supported by a pole or post or hung from a tree branch so as to elevate the feeder above the ground and are built to hold and protect the seed from the elements.

There are a variety of seed feeders that have been constructed to attract various species of wild birds. One popular type is the tube feeder. Tube feeders are hollow, cylindrical tubes, often made of plastic, and have multiple feeding stations spaced along the length of the tube. Typically, feeding stations include a feed port and an adjacent perch, such as a radially extending post, positioned below the feed port to provide the feeding bird with a place to alight and then obtain seed through the port while the bird stands on the perch. Feeders intended for gold finches, however, who like to feed while in an upside down position, are made with the perch positioned above the feed port. Other birds such as nuthatches, and some varieties of woodpeckers, also like to eat upside down and will do so if a suitable bird supporting structure is available to them.

Thistle seed is attractive to finches and can be effectively dispensed with a tube feeder having a plurality of feeding stations. However, thistle seed is also attractive to other birds as well. Since thistle seed is one of the more expensive seeds on the market, when a consumer wants to attract gold finches using thistle seed it would be advantageous if other birds could be prevented from also consuming the seed. At other times, however, the consumer may want to use the feeder to dispense other types of seeds without concern for the type of birds that are able to feed. Accordingly, it would be advantageous to the consumer to have a feeder with an adjustable feed port assembly that can be configured to allow birds to feed in either an upright position or an upside-down position.

SUMMARY OF THE INVENTION

Accordingly, the present invention is directed to bird feeders that have a reservoir with a sidewall for holding seed. The sidewall includes at least one opening or feed port through which birds can access seed held in the reservoir. Access to the feed port is adjustable to enable birds to obtain seed in the feeder in an upright position and/or in an upside down position.

According to first and second embodiments, the present invention includes a feed port assembly connected to the reservoir sidewall within the opening. The feed port assembly includes a stationary base having a central opening into which is fitted a rotatable insert. The central opening in the stationary base is generally about the size of the sidewall opening in the reservoir. The insert has a body that largely covers the base central opening to retain seed in the reservoir, while having a plurality of small openings therein to allow appropriately sized birds to access seed through the openings. The insert also has a perch connected thereto that extends from the insert body and is movable therewith as a unit. The insert body may also be provided with ornamental features to enhance the appearance of the feed port assembly, such as simulated flower petals or the like.

When connected to the base, the insert may be adjusted between one of two positions. In a first position, referred to herein as the upright position, the insert is oriented in the base so that the perch is below the sidewall opening in the reservoir. In a second position, referred to herein as the upside down position, the insert is oriented in the base so that the perch is above the sidewall opening. Hence, when the insert is in the upright position, birds access seed through the small openings while standing on the perch. Conversely, when the insert is in the upside down position, birds can access seed through the openings in the body by hanging upside down from the same perch. The consumer is free to position the insert in either position, depending upon which type or types of birds the consumer wants to attract to the feeder for feeding.

According to a third embodiment, the present invention includes at least an upper opening or feed port, a lower opening or feed port and a stationary perch that are arranged in generally vertical alignment with one another in the reservoir side wall. The stationary perch is positioned between and approximately equidistant from the upper and lower feed ports. An adjustable port element, sometimes referred to herein as a stem, has a first end by which the stem is rotatably mounted on the perch and a second end distal to the mounting end. The second end of the stem is configured to block access to either the upper feed port or the lower feed port by rotating the stem around the perch between a first upper feed port blocking position and a second lower feed port blocking position. According to the third embodiment shown herein, the second end preferably has a locking member that is inserted into the feed port being blocked. When the stem is in the first upper feed port blocking position, birds access seed through the lower feed port by hanging upside down from the perch. Conversely, when the stem is in the second lower feed port blocking position, birds can access seed through the upper feed port while standing in an upright position on the same perch. Therefore, as in the first and second embodiments, the consumer is free to adjust the configuration of the bird feeder for upside down or right side up feed port access according to which type or types of birds the consumer wants to attract to the feeder for feeding.

In view of the foregoing, it is an object of the present invention to provide a new and useful bird feeder having adjustable feed port access that enables the consumer to allow birds to feed in either an upright position or an upside down position.

Another object of the present invention is to provide a bird feeder in accordance with the preceding object that, by providing finches with two orientations for feeding, effectively makes the feeder a two-in-one finch feeder.

Still another object of the present invention is to provide an improved bird feeder in accordance with the preceding objects in which either the upright or the upside down feeding position is selected by adjustment of a member that is rotatable with respect to a reservoir side wall of the bird feeder.

A further object of the present invention is to provide a first embodiment and a second embodiment of an improved bird feeder in accordance with the preceding objects in which the rotatable member is part of an adjustable feed port assembly and in which both upright and upside down feeding positions are provided by a single perch that is part of the same feed port assembly.

Yet another object of the present invention is to provide the first and second embodiments of an improved bird feeder in accordance with the preceding object in which the feed port assembly includes a stationary base fitted with a movable insert that is integral with or coupled to the perch, the insert with perch being rotatable within the base to move between two positions, an upright position enabling birds to feed standing on the perch and an upside down position requiring the birds to hang upside down from the perch to feed.

Still another object of the present invention is to provide a third embodiment of an improved bird feeder in accordance with the first three of the preceding objects in which the adjustable port element or stem has a first end mounted to a stationary perch and a second end distal to the mounting end, the second end being configured to block access to either an upper feed port positioned above the perch or a lower feed port positioned below the perch by rotating the stem around the perch between a first upper feed port blocking position in which birds access seed through the lower feed port by hanging upside down from the perch and a second lower feed port blocking position, in which birds can access seed through the upper feed port while standing in an upright position on the same perch.

A further object of the present invention is to provide the third embodiment of an improved bird feeder in accordance with the preceding object in which the upper feed port, the perch and the lower feed port are in generally vertical alignment with one another with the perch being spaced between and approximately equidistant from the upper and lower feed ports.

A yet further object of the present invention is to provide the third embodiment of an improved bird feeder in accordance with the preceding two objects in which the second end of the adjustable port element or stem has a blocking structure with a locking member that is inserted into a respective one of the upper and lower feed ports to secure the blocking structure over the feed port to prevent access thereto.

A still further object of the present invention is to provide an improved bird feeder in accordance with the preceding objects that is not complex in structure and which can be manufactured at low cost but yet efficiently enables the consumer to change the configuration of the feeder to best attract the type or types of birds desired.

BRIEF DESCRIPTION OF THE FIGURES

FIG. 7A is a front perspective view of the insert shown in FIGS. 5A-5C.

FIG. 7B is a side view of the insert shown in FIG. 7A.

FIG. 7C is a top view of the insert shown in FIG. 7A.

FIG. 7D is a front view of the insert shown in FIG. 7A.

FIG. 9D is an enlarged view of Detail B as shown in FIG. 9B.

FIG. 10 is a perspective view of the elongated perch member of the adjustable port bird feeder shown in FIG. 9.

FIG. 10D is a cross sectional view of the elongated perch member taken along line C-C shown in FIG. 10B.

FIG. 10E is an enlarged view of Detail B as shown in FIG. 10B.

FIG. 10F is a cross sectional view of the elongated perch member taken along line D-D shown in FIG. 10E.

FIG. 10G is an end view of the elongated perch member shown in FIGS. 10 and 10A-10C.

FIG. 12 is a perspective view of the adjustable port element of the adjustable port bird feeder shown in FIG. 9, showing the outer side of the adjustable port element which faces away from the reservoir when the feeder is assembled.

FIG. 12A is a plan view of the outer side of the adjustable port element shown in FIG. 12.

FIG. 12B is a side view of the adjustable port element shown in FIGS. 12 and 12A.

DETAILED DESCRIPTION OF THE PREFERRED EMBODIMENTS

Figure 1:
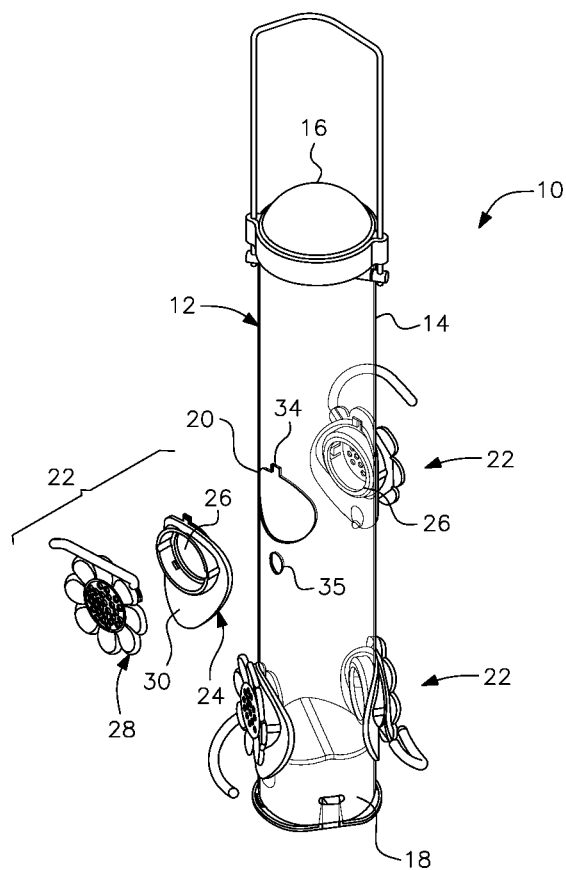
FIG. 1 is a perspective view of one embodiment of an adjustable port bird feeder in accordance with the present invention in which the components of one of the feed port assemblies are shown in an exploded view.
Figure 2A:
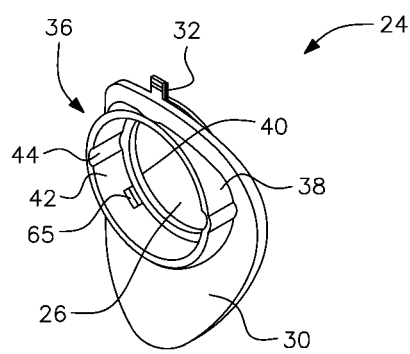
FIG. 2A is a front perspective view of the base for the feed port assemblies shown in FIG. 1.
Figure 2B:
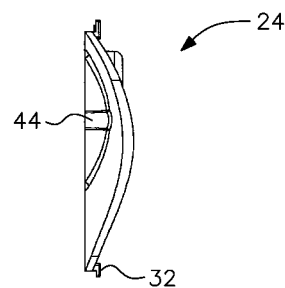
FIG. 2B is a side view of the base shown in FIG. 2A.
Figure 2C:
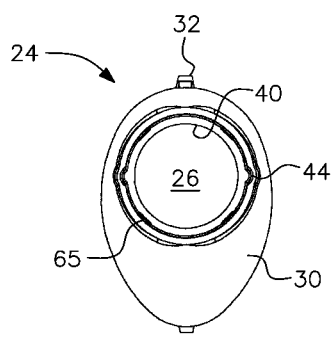
FIG. 2C is a front view of the base shown in FIG. 2A.
Figure 2D:
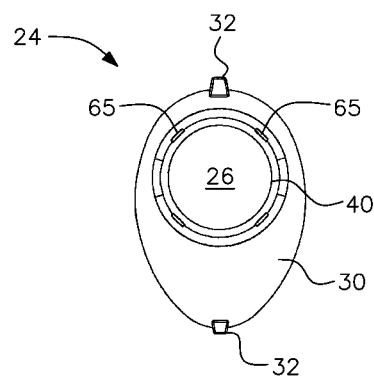
FIG. 2D is a rear view of the base shown in FIG. 2A.
Figure 3A:
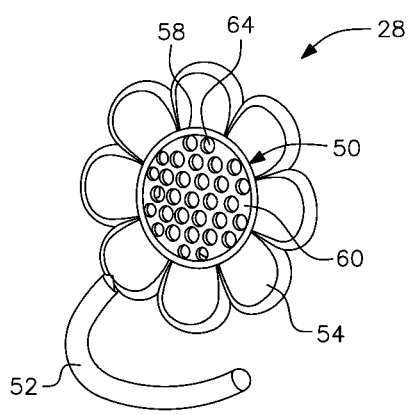
FIG. 3A is a front perspective view of the insert for the feed port assemblies shown in FIG. 1.
Figure 3B:
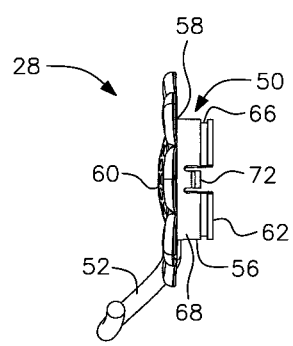
FIG. 3B is a side view of the insert shown in FIG. 3A.
Figure 3C:
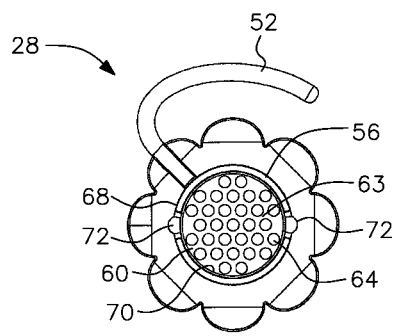
FIG. 3C is a rear view of the insert shown in FIG. 3A.
Figure 3D:
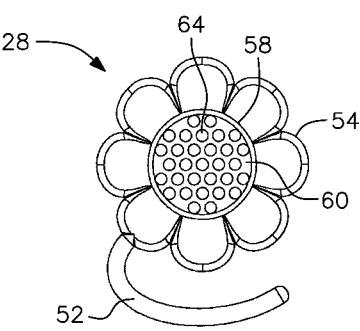
FIG. 3D is a front view of the insert shown in FIG. 3A.

In describing preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

As used herein, "front" refers to the side of a component that faces outwardly from the bird feeder when the feed port assembly is assembled onto the reservoir. Conversely, "rear" refers to the opposite side, namely the side of the component that faces the interior of the reservoir of the bird feeder when assembled.

As shown in FIG. 1, according to a first embodiment the present invention is directed to a bird feeder generally designated by reference numeral 10. The bird feeder has a reservoir generally designated by reference numeral 12 with a side wall 14 for holding seed, a cover 16 and a feeder base 18. The reservoir side wall 14 has at least one reservoir side wall opening 20 that allows for seed access through the side wall of the reservoir. Fitted within the opening is a feed port assembly generally designated by reference numeral 22.

As shown in FIG. 1, the feed port assembly 22 includes a base generally designated by reference numeral 24 with a central opening 26 and a rotatable insert generally designated by reference numeral 28. According to the first embodiment, both the base 24 and the insert 28 are made of a plastic material such as polypropylene, although other suitable plastics could be used.

In the illustrated embodiment, the base 24 has a mounting body 30 that is curved to match the generally cylindrical side wall of the reservoir 12; such curvature is not required, however, depending upon the shaping of the reservoir. The mounting body 30 attaches to the reservoir side wall opening 20 by securing tabs 32 on the base 24 into corresponding notch 34 and opening 35 formed in the sidewall 14. Other means of attachment could also be used as would be known by persons of skill in the art. The base 24 thus remains connected in a fixed position with respect to the reservoir sidewall opening 20 both in use and when changing the orientation of the insert relative to the base.

As shown in greater detail in FIGS. 2A-2D, the base 24 includes a collar generally designated by reference numeral 36, which projects outwardly and rearwardly from the mounting body 30. In the illustrated embodiment, the collar 36 has a generally cylindrical sidewall 38, with the inner diameter of the collar 36 being slightly larger than the inner diameter of the base central opening 26 to form a generally circular lip 40 that is used to secure the insert 28 in the base 24. Positioned adjacent and inwardly of the circumference of the lip are a plurality of lugs 65 spaced approximately equidistantly from one another around the lip. In the illustrated embodiment, four lugs are provided. The inner surface 42 of the collar is generally cylindrical and has two positioning grooves 44 on opposing sides of the collar sidewall 38 that extend generally perpendicular to the mounting body 30.

The rotatable insert 28 is shown in greater detail in FIGS. 3A-3D. The insert 28 includes a body generally designated by reference numeral 50 and a perch 52. The insert may also optionally include ornamental features 54 such as simulated flower petals as shown in FIG. 1 and FIGS. 3A-3D. Other ornamental features could be utilized as known to those skilled in the art.

The body 50 of the insert 28 has an insertion part 56 and a face plate 60. The insertion part 56 includes sidewall 68 which is sized to be at least partly received within the base central collar 36. The front end 58 of the sidewall 68 is covered by the face plate 60, but the rear end is left open to provide open area 63 (see FIG. 3C), having direct communication with the central opening 26 in the base 24 and thereby with seed in the reservoir. Thus seed in the reservoir can fill the open area 63 inside sidewall 68 through central opening 26. The face plate 60 in the illustrated embodiment is generally circular and includes a plurality of seed accessing holes 64 therein to allow appropriately sized birds to access seed through the openings 64. Also in the illustrated embodiment, the insertion part 56 is generally cylindrical to correspond with the generally cylindrical sidewall of the collar 36.

The side wall 68 has a radial channel 66 adjacent its rear end 62 that, in conjunction with the lip, is used to engage the insert 28 with the base 24. More particularly, the lugs 65 on the inner surface 42 of the collar side wall 38 (see FIGS. 2A and 2C) are received within the channel 66 and ride therein when the insert is rotated. The sidewall 68 of the insertion part 56 is further provided with two detents 72 on opposing sides of the insertion part 56. The detents 72 are received within the positioning grooves 44 formed on the inner surface 42 of the collar sidewall 38 when the insert is connected to the base.

The perch 52 is coupled in a fixed relationship to the body 50 or is molded therewith so as to provide a single unitary unit. While shown as a curved member, the perch may be made in a variety of shapes suitable for use by a bird in perching upright or hanging upside down in the manner described herein.

Figure 4A:
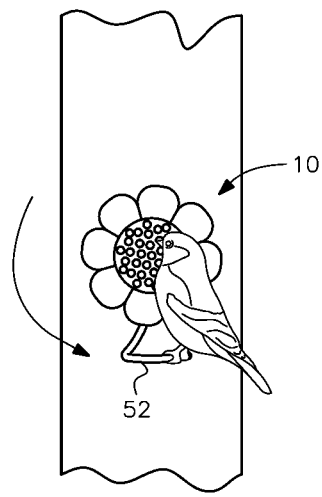
FIG. 4A illustrates a feed port assembly as shown in FIG. 1 with a bird feeding thereon in the upright position in accordance with the present invention.
Figure 4B:
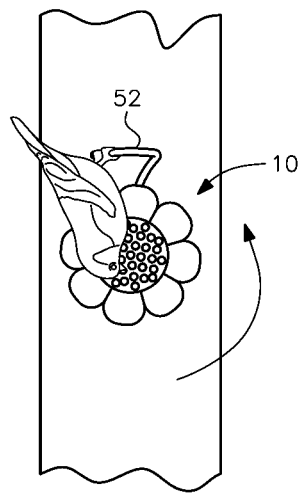
FIG. 4B illustrates a bird feeding on the same feed port assembly as that shown in FIG. 4A, but now in the upside down position in accordance with the present invention.

As already noted, the insert 28 is adjustable between two positions when coupled to the base 24: an upright position and an upside down position. When the insert is in the upright position, the perch 52 is below the face plate 60 and the seed accessing holes 64 therein as shown in FIG. 4A. Alternatively, when the insert 28 is in the upside down position, the perch 52 is above the face plate and seed accessing holes 64 so that birds hang upside down from the perch as shown in FIG. 4B. These two positions are essentially 180 degrees apart as defined by the positioning grooves 44 in the collar 36 and the detents 72 on the insertion part 56.

In particular, the positioning grooves 44 may be defined as including a first positioning groove and an opposing positioning groove for purposes of description; there is no difference between the grooves and either groove can be designated the first positioning groove in which case the other groove is necessarily designated the opposing positioning groove. Similarly, the detents 72 may be defined as including a first detent and an opposing detent for purposes of description; there is no difference between the detents and either detent can be designated the first detent in which case the other detent is necessarily designated the opposing detent. The insert 28 is in the upright position when the first detent is aligned with the first positioning groove and the opposing detent is aligned with the opposing positioning groove, and the insert 28 is in the upside position when the first detent is aligned with the opposing positioning groove and the opposing detent is aligned with the first positioning groove.

To change the orientation of the insert from the upright position to the upside position or vice versa, the user has only to rotate the insert 180 degrees. The detents 72, while having sufficient engagement within the positioning grooves to hold the insert in either one of the two positions while the feeder is in use, are flexible enough to be pressed inwardly out of the grooves and against the inner surface of the collar when rotational force is applied by the user to rotate the insert 180 degrees to the other of the two positions.

Figures 5A, 5B:
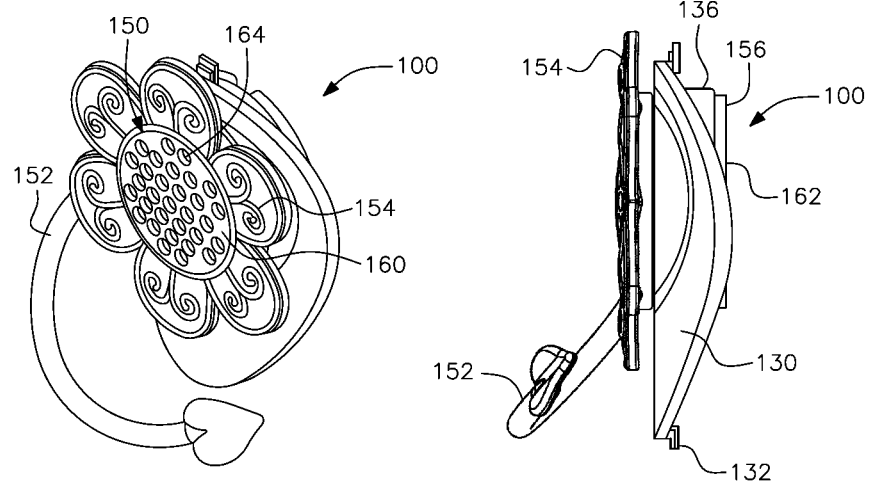
FIG. 5A is a front perspective view of a second embodiment of an adjustable feed port assembly in accordance with the present invention.
FIG. 5B is a side view of the feed port assembly shown in FIG. 5A.
Figure 5C:
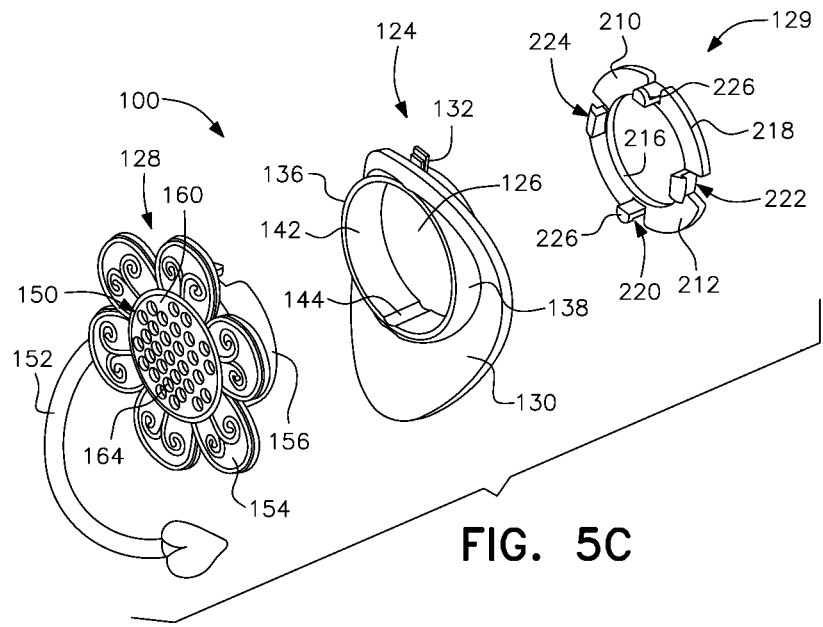
FIG. 5C is an exploded perspective view of the components of the feed port assembly shown in FIG. 5A, including a base, an insert and a connecting member.
Figures 6A, 6B:
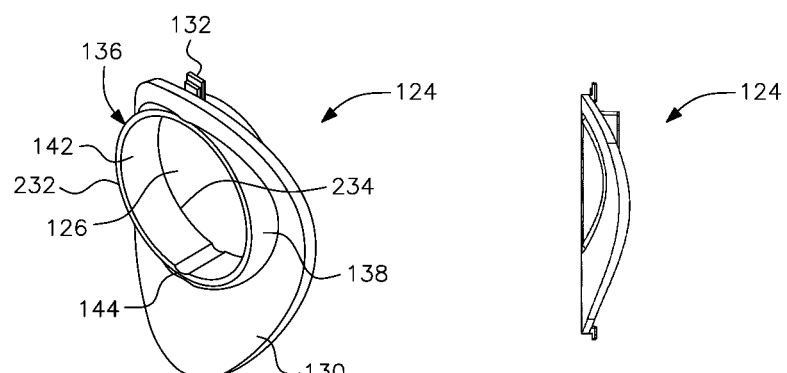
FIG. 6A is a front perspective view of the base shown in FIGS. 5A-5C.
FIG. 6B is a side view of the base shown in FIG. 6A.
Figures 6C, 6D:
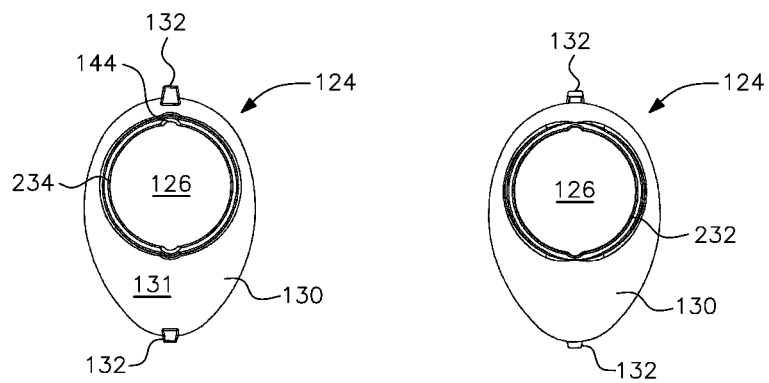
FIG. 6C is a rear view of the base shown in FIG. 6A.
FIG. 6D is a front view of the base shown in FIG. 6A.
Figures 8A, 8B:
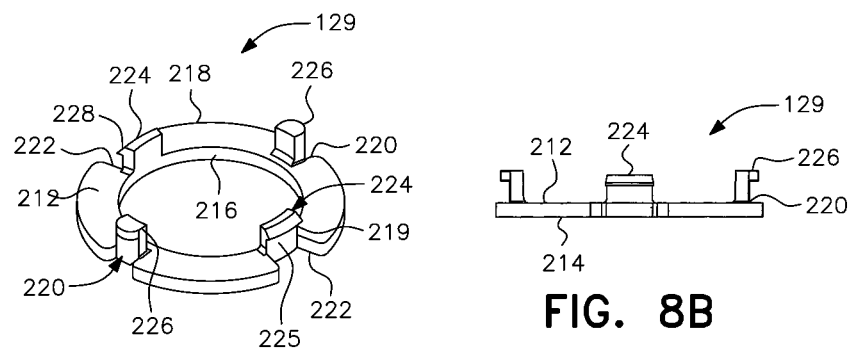
FIG. 8A is a front perspective view of the connecting member shown in FIGS. 5A-C.
FIG. 8B is a side view of the connecting member shown in FIG. 8A.
Figures 8C, 8D:
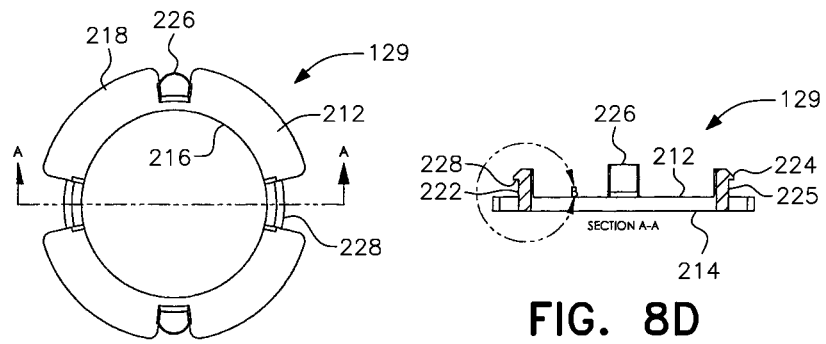
FIG. 8C is a front view of the connecting member shown in FIG. 8A.
FIG. 8D is a cross-sectional view of the connecting member shown in FIG. 8C.
Figure 8E:
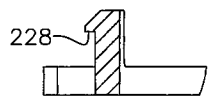
FIG. 8E is an enlarged view of Detail B shown in FIG. 8D.

A feed port assembly according to a second embodiment of the present invention is shown in FIGS. 5A-5C. The second embodiment of the feed port assembly, generally designated by reference numeral 100, includes a base, generally designated by reference numeral 124, with a central opening 126, a rotatable insert generally designated by reference numeral 128, and a connecting member generally designated by reference numeral 129. According to the second embodiment, both the base 124 and the insert 128 are made of metal, such as zinc, while the connecting member 129 is made of a plastic material such as polypropylene.

Like the first embodiment, the base 124 has a mounting body 130 that is curved to match the generally cylindrical side wall of the reservoir; such curvature is not required however, depending upon the shaping of the reservoir. The mounting body 130 attaches to the reservoir side wall opening 20 by securing tabs 132 on the base into corresponding notch 34 and opening 35 formed in the top of the reservoir sidewall opening and below the opening, respectively. Other means of attachment could also be used as would be known by persons of skill in the art. As in the first embodiment, the base remains fixed as mounted on the reservoir sidewall both in use and when the insert is being adjusted.

As shown in greater detail in FIGS. 6A-6D, the mounting body 130 includes a central collar 136 having a generally cylindrical sidewall 138. The inner surface 142 of the collar 136 is provided with two positioning grooves 144 on opposing sides of the inner surface 142 of the collar sidewall 138 that extend generally perpendicularly to the mounting body. These positioning grooves 144 serve to guide positioning tabs 226 of the connecting member 129 so as to engage the connecting member as coupled to the insert in the desired orientation within the opening 126 of the base 124.

The rotatable insert 128 is shown in greater detail in FIGS. 7A-7D. As in the first embodiment, the insert 128 includes a body generally designated by reference numeral 150 and a perch generally designated by reference numeral 152. The insert may also optionally include ornamental features 154 such as simulated flower petals.

The mounting body 130 of the insert 128 has an insertion part 156 and a face plate 160. The insertion part 156 has a generally cylindrical sidewall 168 and is sized to be received within the base collar 136. The outer end 158 of the insertion part 156 is covered by the face plate 160 which, in the illustrated embodiment, is generally circular. The inner end 162 of the generally cylindrical insertion part 156 is not covered, leaving open area 163 which is in direct communication with the central opening 126 in the base 124 and thereby with seed in the reservoir. The face plate 160 includes a plurality of seed accessing holes 164 therein to allow appropriately sized birds to access seed in the open area 163 through the openings 164.

The sidewall 168 of the insertion part 156 is provided with slots 200 on two opposing sides to receive locking tabs on the connecting member 129 (see FIGS. 8A-8E), as will be described hereinafter. The sidewall 168 of the insertion part 156 is also provided with two notches 202 on a second set of opposing sides of the sidewall; the opposing sides of the sidewall having the slots 200 are approximately 90 degrees offset from the second set of opposing sidewalls having the notches 202. The notches 202 provide clearance for the positioning tabs 226 when the feed port assembly is being assembled.

The perch 152 is coupled to the body 150 in a fixed relationship or formed therewith so as to be movable as a single unit. As with the first embodiment, the perch 152 may be made in a variety of shapes suitable for use by a bird in perching upright or hanging upside down in the manner described herein.

The base 124 and the insert 128 are coupled to one another by the connecting member generally designated by reference numeral 129 which is shown in FIGS. 8A-8E. The connecting member 129 has an annular body 210, a generally flat front surface 212, a generally flat rear surface 214, a cylindrical inner wall 216 and a substantially cylindrical outer wall 218. The outer wall 218 includes four cutouts spaced approximately 90 degrees from one another around the circumference of the outer wall 218. Hence, there are two sets of opposing cutouts, a first set referred to herein as insert positioning tab cutouts generally designated by reference numeral 220, and a second set referred to herein as locking tab slots generally designated by reference numeral 222.

Each of the locking tab slots 222 includes a locking tab generally designated by reference numeral 224 positioned therein and projecting outwardly from the front surface of the body 210. Each locking tab 224 includes an arm 225 and an outwardly directed lip 228 at the end of the arm. The arm 225 is generally perpendicular to the body 210, while the lip 228 is generally parallel with the annular body 210 and spaced therefrom by the arm 225. The radial width of the arm 225 is less than the radial width of the annular body 210 so that, even with the locking tabs 224 inserted in the locking tab slots 222, the arm 225 is inset from the outer circumference of the annular body so that the outermost part of the slot 222 remains as a notch 219, albeit shallower than the insert positioning tab cutouts 220. The notch 219 is aligned with the outer diameter of the insert surface 170.

As in the first embodiment, the insert 128 may be adjusted to be in one of two positions when connected to the base 124, the two positions being essentially 180 degrees apart so that if the insert is connected to the base in the upright position the perch is below the face plate and the seed accessing holes (see FIG. 4A) while if the insert is connected to the base in the upside down position, the perch is above the face plate and seed accessing holes (see FIG. 4B). These two positions are defined by the insert positioning tabs 226 in the connecting member 129 which, in cooperation with the notches 202 on the insertion part 156, are engaged with the grooves 144 in the inner surface 142 of the collar sidewall.

The feed port assembly 100 according to the second embodiment is assembled as follows. The base 124 is mounted to the seed reservoir by inserting the collar 136 of the base 124 into the reservoir side wall opening 20, aligning the tabs 132 on the mounting body 30 with the notch 34 and opening 35 in the reservoir side wall and securing the mounting body 130 against the outer surface of the side wall opening by inserting the tabs into the notch and opening. The connecting member 129 is coupled to the insert 128 by pressing the front side of the connecting member into the back of the insert until the locking tabs 224 on the connecting member snap into the slots 200 in the opposing sides of the insert, thereby securing the connecting member to the insert. When the locking tabs 224 are secured in the slots 200, the insert positioning tabs 226 extend through the notches 202 on the insert and into the positioning grooves 144 on the base collar 136. The engagement between the insert positioning tabs 226 on the connecting member and the positioning grooves 144 on the base collar 136 holds the insert in the desired right side up or upside down orientation in use. To change the orientation of the insert from the upright position to the upside position or vice versa, the user has only to rotate the insert 180 degrees. The positioning tabs 226, while having sufficient engagement within the insert positioning grooves 144 to hold the insert in either one of the two positions while in use, are flexible enough to be pressed inwardly out of the grooves and against the inner surface of the collar when rotational force is applied by the user to rotate the insert 180 degrees to the other of the two positions.

With the feed port assembly having an insert 150 and perch 152 that are mounted within a base and rotatable with respect to the base between two positions as described herein, the consumer is able to use the feeder as strictly a thistle seed gold finch feeder, i.e., with the feed port assembly in the upside down position so that the perch is above the seed access openings and, when and if desired, can easily convert the same feeder into a general access, regular seed type bird feeder in which the perch is positioned below the seed access opening to accommodate not only finches but also birds who feed only from an upright position.

Figures 9, 9A:
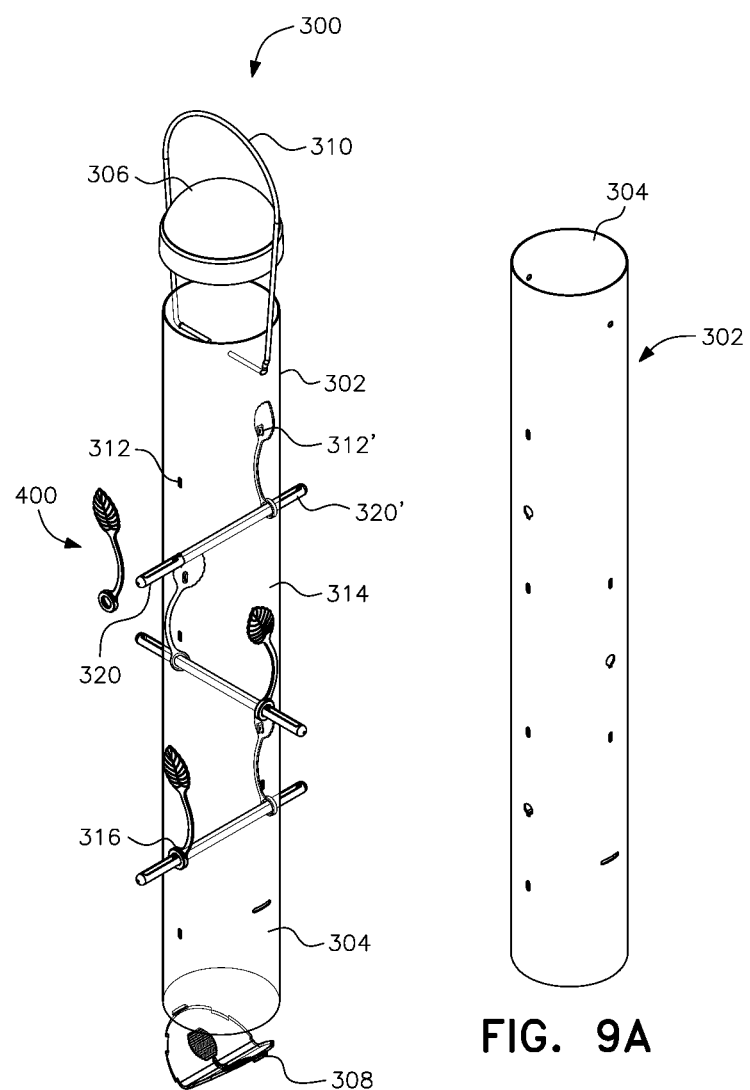
FIG. 9 is a perspective view of a third embodiment of an adjustable port bird feeder in accordance with the present invention in which some of the components of the feeder are shown in an exploded view.
FIG. 9A is a perspective view of the reservoir of the adjustable port bird feeder shown in FIG. 9.

According to a third embodiment illustrated in FIG. 9, the present invention is directed to a bird feeder with adjustable port access, generally designated by reference numeral 300. The feeder 300 has a reservoir, generally designated by reference numeral 302, with a side wall 304 for holding seed, a lid 306 and a feeder base part 308. The feeder may also be provided with a hanger 310 enabling the feeder to be suspended from a supporting structure in a conventional manner.

As variously shown in FIGS. 9, 9A, 9B, 9C and 9D, the side wall 304 on a first side of the reservoir has at least one upper opening or feed port 312 and one lower opening or feed port 314 spaced from and in generally vertical alignment with one another that allow for seed access through the first side of the reservoir 302. The side wall 304 on a second side of the reservoir 302 opposite the first side is also provided with at least one upper feed port 312' and one lower feed port 314' spaced from and in generally vertical alignment with one another that allow for seed access through the second side of the reservoir 302. In the illustrated embodiment, the upper and lower feed ports 312, 314 on the first side of the reservoir are in generally horizontal alignment with the upper and lower feed ports 312', 314' on the second side, respectively. Offset by approximately 90° from feed ports 312, 312', 314, 314' and vertically spaced therefrom is another pair of upper and lower feed ports 312'''', 314'''' having the same relative arrangement with respect to one another as do feed ports 312, 314 and 312', 314' just described (see FIG. 9C).

Figures 9B, 9C:
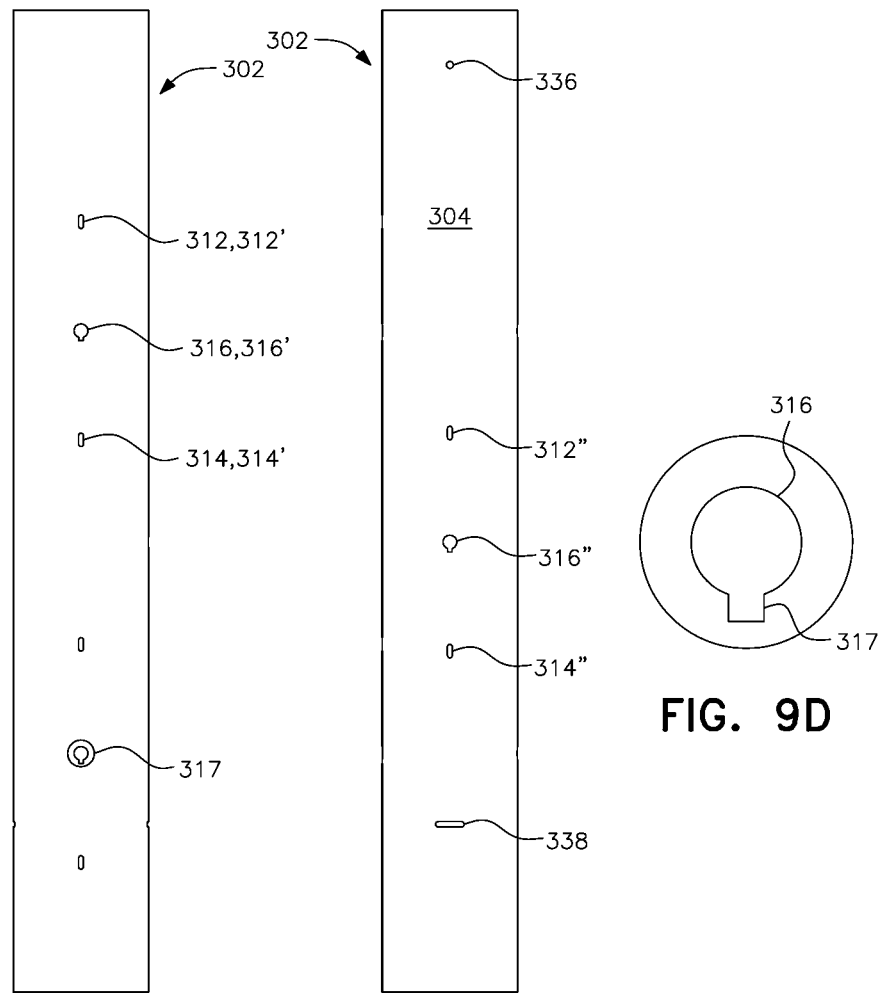
FIG. 9B is a first side view of the reservoir shown in FIG. 9A.
FIG. 9C is a second side view of the reservoir shown in FIGS. 9A and 9B with the reservoir rotated 90° with respect to the reservoir shown in FIG. 9B.

Positioned between and approximately equidistant from the upper and lower feed ports 312, 314 on the first side of the reservoir is a first perch mount aperture 316 formed in the reservoir side wall. A corresponding second perch mount aperture 316' is formed in the second side of the reservoir side wall between the upper and lower feed ports on the opposing side of the reservoir. The second perch mount aperture 316' is in substantially horizontal alignment with the first perch mount aperture 316. A third perch mount aperture 316'''' is formed between the upper and lower feed ports 312'''', 314'''' as shown in FIG. 9C. Located on the opposite side of the reservoir relative to the third perch mount aperture as well as its associated feed ports is a corresponding fourth perch mount aperture with associated feed ports which are not specifically identified with reference numerals but are shown in FIG. 9.

Figure 10A:
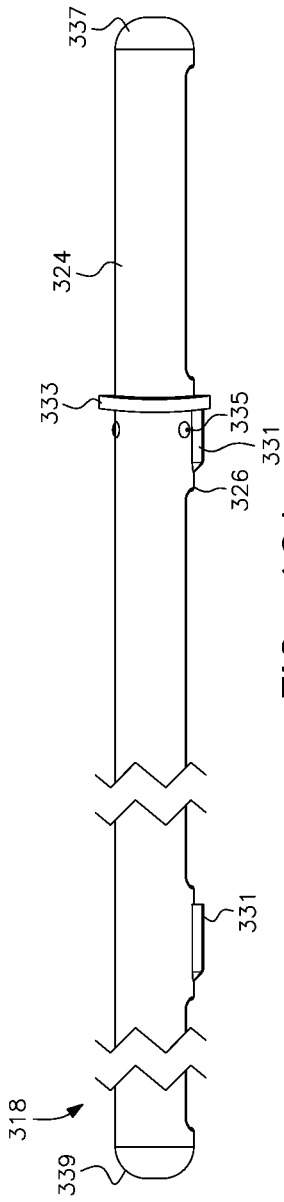
FIG. 10A is a side view of the elongated perch member shown in FIG. 10.
Figure 10B:
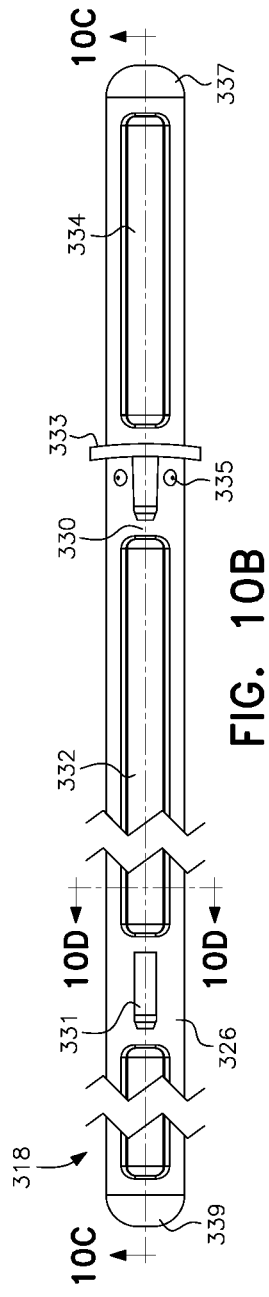
FIG. 10B is a bottom view of the elongated perch member shown in FIGS. 10 and 10A.
Figure 10C:
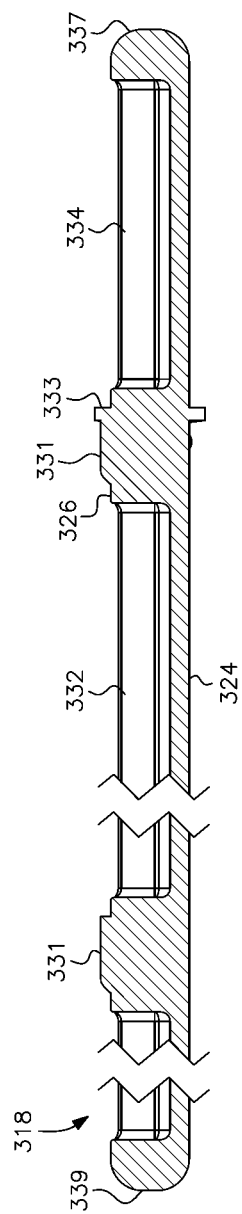
FIG. 10C is a sectional view of the elongated perch member taken along line A-A shown in FIG. 10B.

An elongated perch member, generally designated by reference numeral 318 and shown in detail in FIGS. 10, 10A and 10B, is received through the first and second perch mount apertures 316, 316' so as to span the inner diameter of the reservoir and extend outwardly from at least one side of the reservoir to form a perch 320 (see FIG. 9). According to the illustrated embodiment, the perch mount apertures have a keyed part 317 to properly orient the elongated perch member. The elongated perch member 318 extends outwardly from the reservoir side wall preferably on both the first and second opposing sides of the reservoir so that the outwardly extending portions of the elongated perch member form two perches 320, 320', one on either side of the reservoir.

The outer surface of the elongated perch member 318 preferably has a generally rounded top 324 and a bottom 326 with a longitudinally extending channel, generally designated by reference numeral 328. As shown in FIGS. 10 and 10A-10F, the channel 328 is divided by two interruptions 330 along the length thereof that divide the channel 328 into a center channel part 332 and two shorter end channel parts 334. The channels are not necessary but facilitate manufacture when the perch member is made by injection molding.

The outer surface of the elongated perch member 318 is provided with a pair of keys 331, a flange 333 and a plurality of small protrusions 335 adjacent but longitudinally spaced from the flange 333. The keys 331 are sized and shaped to be received within the keyed part 317 of their respective perch mount apertures to mount the elongated perch member 318 in the proper orientation.

The flange 333 and protrusions 335 are used to secure the elongated perch member within a pair of opposing perch mount apertures 316 with a snap fit. The distance between the flange and a first end 337 of the elongated perch member 318 defines the length of the first perch that extends from one side of the reservoir when the feeder is assembled. As illustrated, the overall length of the member 318 is such that the second end 339 of the member 318 protruding on the opposite side of the reservoir to form the opposing perch is substantially equal in length to the first perch.

To mount the elongated perch member 318, the second end 339 of the elongated perch member 318 is inserted through a first perch mount aperture, across the interior of the reservoir and into the opposing second perch mount aperture, with the keys 331 being aligned with the keyed parts 317. By continuing to push the first end 337 toward the reservoir, the protrusions 335 will be compressed sufficiently to pass through the first perch mount aperture in the reservoir side wall and then snap back once inside the reservoir. The flange 333 prevents further inward movement while the protrusions 335, now on the opposite side of the reservoir side wall from the flange 333, provide sufficient resistance to prevent easy removal of the elongated perch member.

While in the illustrated embodiment the elongated perch member 318 is mounted in the first and second perch mount apertures 316, 316' to span the interior of the reservoir, it would be understood by persons of skill in the art that one or more perches of varying design could be mounted to the reservoir side wall in other ways other than that shown. For example, a perch may be constructed as part of a feed port assembly that is wholly supported by one side of the reservoir as is the case with the first and second embodiments. The present invention is intended to include all bird feeder configurations having an upper feed port, a lower feed port and a perch spaced from and in generally vertical alignment with the upper and lower feed ports to form a feeding station that provides birds with access to both the upper and lower feed ports from the same perch.

The association of the first upper feed port 312, the second lower feed port 314, and the perch 320 extending from the first perch mount aperture 316 form a feeding station. As shown in FIG. 9, the bird feeder 300 is preferably provided with a plurality of feeding stations. The feeding stations are paired with one another as each elongated perch member forms two perches on opposing sides of the reservoir, each of which is part of a respective feeding station. The bird feeder illustrated in FIG. 9 has six feeding stations, including two upper feeding stations, two middle feeding stations and two lower feeding stations respectfully arranged as three feeding station pairs spaced from one another both around and longitudinally along the reservoir. The upper feed ports and the lower feed ports of the two middle feeding stations are positioned about 90° out from the feed ports of the upper and lower feeding stations. Greater or lesser numbers of feeding stations could, of course, be included. Further, while the vertical and spaced relationship of the first upper feed port, the second lower feed port and the perch should be maintained for each feeding station, the vertical and rotational relationship of the various feeding stations does not have to be as shown in FIG. 9.

Near the top of the reservoir, two opposing sides of the reservoir side wall are each provided with a handle mounting aperture 336. The inwardly directed arms 311 of the handle 310 are received within the handle mounting apertures 336 to secure the handle to the reservoir. Near the lower end of the reservoir, two opposing sides of the reservoir side wall are each provided with a feeder base part mounting aperture 338.

The feeder base part mounting apertures 338 enable the feeder base part to be secured to the reservoir side wall.

As shown in FIGS. 11 and 11A-E, the feeder base part 308 is embodied as a baffle, generally designated by reference numeral 340. The baffle 340 is generally circular and is divided along a center diameter by a fold 342. The fold 342 divides the baffle 340 into two semi-circular sides 344 that are joined at an angle of between about 90° and about 110°, with the longitudinal center of the fold 342 having an aperture 346 to provide drainage in the event that water is captured in the reservoir.

Figure 11:
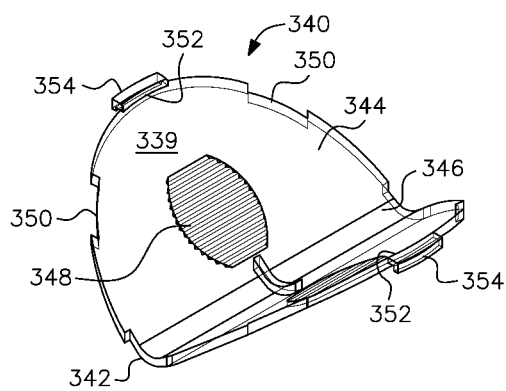
FIG. 11 is a perspective view of the feeder base part of the adjustable port bird feeder shown in FIG. 9.
Figure 11A:
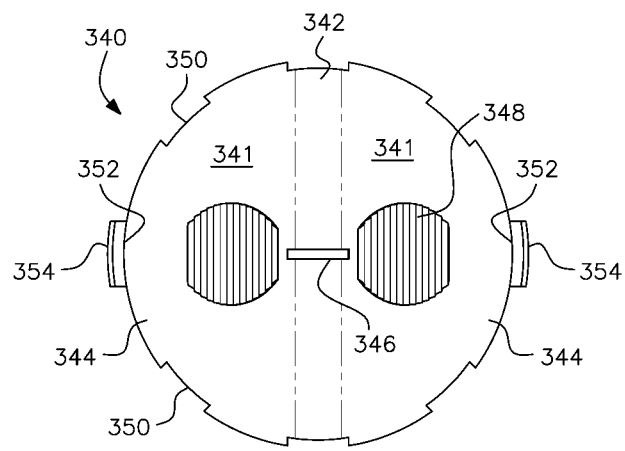
FIG. 11A is a bottom view of the feeder base part shown in FIG. 11.
Figure 11B:
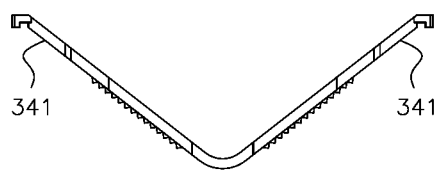
FIG. 11B is a side view of the feeder base part shown in FIGS. 11 and 11A.
Figure 11C:
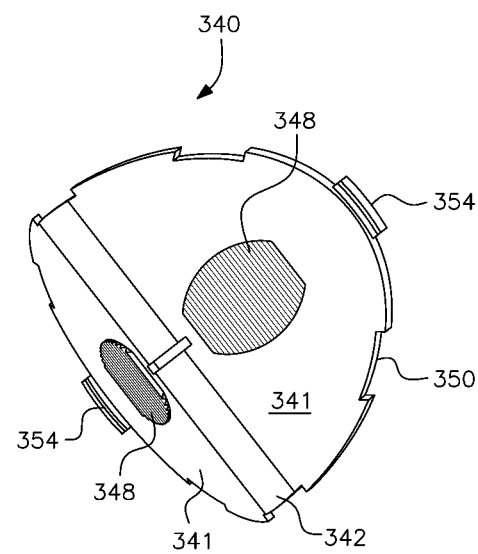
FIG. 11C is a view of the feeder base part taken along line D-D shown in FIG. 11B.
Figure 11D:
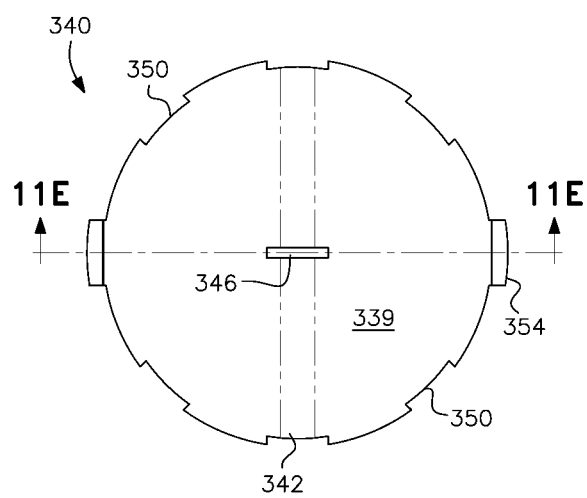
FIG. 11D is a top view of the feeder base part shown in FIGS. 11 and 11A-11D.
Figure 11E:
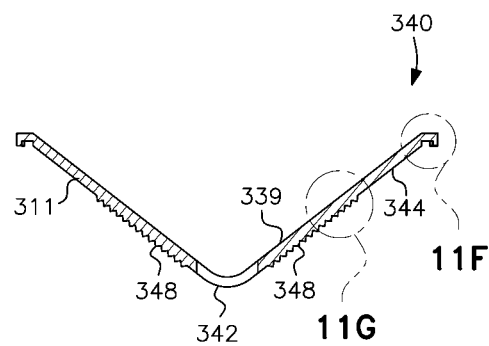
FIG. 11E is a sectional view of the feeder base part taken along line A-A shown in FIG. 11D.
Figure 11F:
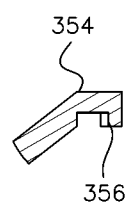
FIG. 11F is an enlarged view of Detail B as shown in FIG. 11E.
Figure 11G:
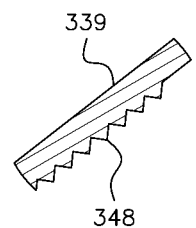
FIG. 11G is an enlarged view of Detail C as shown in FIG. 11E.

When mounted within the reservoir, the baffle is positioned with the angled sides 344 facing upwardly. The upper surface 339 is smooth while the lower surface 341 on each side 344 is provided with a textured area 348. As best shown in FIG. 11G, the textured area 348 includes a plurality of ribs that provide a user's fingers with traction when gripping the baffle for mounting and removal. Other patterns of one or more raised elements on each side 344 could be used as would be understood by persons of skill in the art.

The baffle may preferably be made of acrylic, PVC, clear polystyrene or like material(s). The view shown in FIG. 11 illustrates the baffle when made of a transparent material, the transparency allowing the textured area 348 to be seen from the upper surface 339. As would be understood, the baffle may alternatively be made of a non-transparent material.

Spaced around the outer perimeter of the baffle 340 are a plurality of cutouts 350. The cutouts allow for additional drainage in the event water enters the reservoir. The upper perimeter edge 352 on each side 344 is provided with a tab 354. As best seen in FIG. 11F, the outer edge of the tab has a hook 356. To position the baffle inside the reservoir and secure the baffle to the reservoir side wall, the tabs 354 are inserted through the feeder base part mounting apertures 338 on opposing sides of the reservoir, with the hooks 356 engaging an outer surface of the reservoir side wall.

Figure 12C:
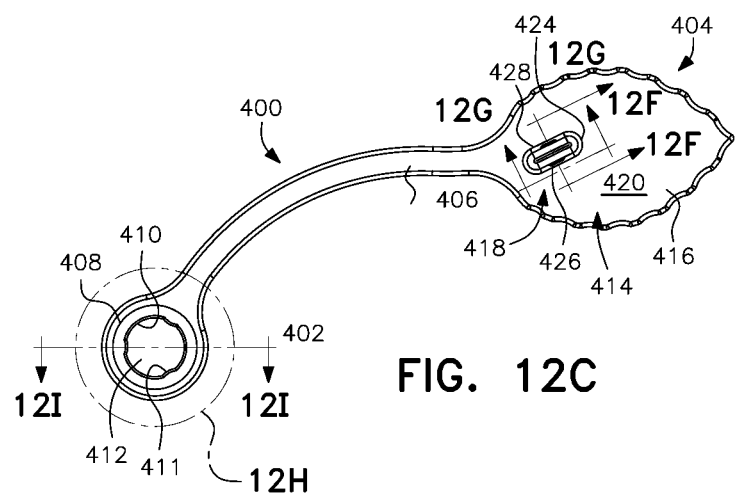
FIG. 12C is a plan view of the inner side of the adjustable port element shown in FIGS. 12, 12A and 12B, the inner side being that side of the adjustable port element facing toward the reservoir when the feeder is assembled.
Figure 12D:
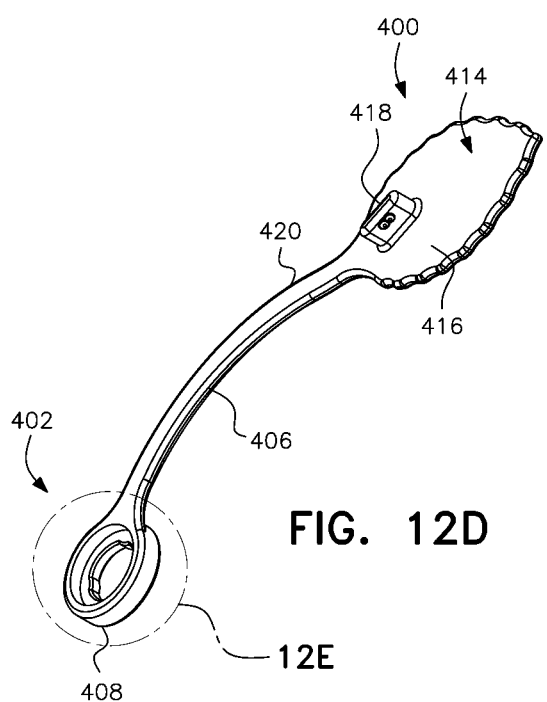
FIG. 12D is a perspective view of the inner side of the adjustable port element of the adjustable port bird feeder shown in FIG. 9.
Figure 12E:
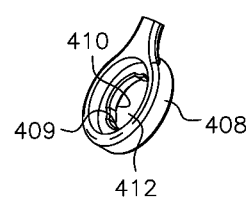
FIG. 12E is an enlarged perspective view of Detail B as shown in FIG. 12D.
Figure 12F:
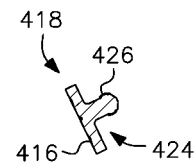
FIG. 12F is a sectional view of the locking member of the adjustable port element taken along line A-A shown in FIG. 12C.
Figure 12G:
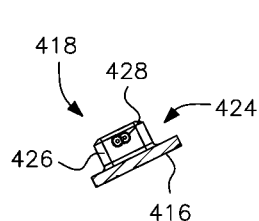
FIG. 12G is a sectional view of the locking member of the adjustable port element taken along line B-B shown in FIG. 12C.
Figure 12H:
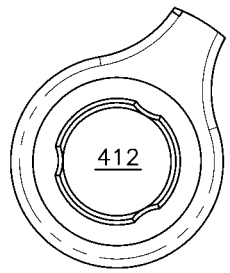
FIG. 12H is an enlarged view of Detail C shown in FIG. 12C.
Figure 12I:
FIG. 12I is a sectional view of the mounting end of the adjustable port element taken along line D-D shown in FIG. 12C.

To enable the consumer to select which of the upper and lower feeding ports is to provide birds with access to the interior of the reservoir at any given time, the bird feeder 300 is provided with an adjustable port element, shown in FIGS. 12 and 12A-12O and generally designated by reference numeral 400. Portions of the adjustable port element 400 are shown in various views in FIGS. 12E-12I.

The adjustable port element 400 as embodied herein is made to resemble a stem having a leaf at one end and is sometimes referred to herein as a "stem". Other ornamental shapes or designs could be used to provide an adjustable port element as would be understood by persons of ordinary skill in the art.

The stem 400 has a first mounting end generally designated by reference numeral 402 and a second end distal from the first end 402 and generally designated by reference numeral 404. The second end 404 is connected to the first end 402 by an elongated member 406. The first mounting end 402 includes an annular ring 408 having an inner circumference 410 that defines an open center 412. The elongated perch member 318 extends through the open center 412 when the first end 402 of the stem 400 is rotatably mounted thereon. Projecting inwardly from the inner circumference 410 are a plurality of raised points 411 that engage with the outer surface of the elongated perch member. With the raised points 411, the stem 400 is frictionally secured on the perch member while, at the same time, the raised points reduce the surface contact between the annular ring 408 and the perch member, allowing the stem 400 to be readily rotated by the user. The first mounting end 402 is further provided with a generally annular cutout 409 that fits around the flange 333 on the elongated perch member.

The second end 404 of the stem 400 has a blocking structure, generally designated by reference numeral 414. The blocking structure 414 is configured to prevent access to either the upper feed port or the lower feed port by rotating the stem around the mounting end 402, as rotatably secured to the perch, to align the blocking structure 414 with, and cover, the desired feed port. The stem 400 is rotatable between a first upper feed port blocking position in which the blocking structure covers the upper feed port and a second lower feed port blocking position in which the blocking structure covers the lower feed port.

The blocking structure 414 includes a covering member 416 and a locking member generally designated by reference numeral 418 on the inner side 420 of the covering member 416. In the illustrated embodiment, the covering member 416 is generally planar and is provided with an ornamental leaf shape, with an outer side 422 thereof having ornamental leaf texturing. As used herein, the "outer" side 422 is that side of the adjustable port element facing away from the reservoir when the feeder is assembled. The "inner" side 420 is that side of the adjustable port element facing toward the reservoir when the feeder is assembled. The leaf-shaped covering member 416 is sized to both cover the feed ports and provide a pleasing aesthetic. As would be understood, other covering member shapes could alternatively be used.

In the illustrated embodiment, the annular ring 408, elongated member 406 and covering member 416 of the adjustable port element or stem 400 are made from an integral piece of molded material such as high density polyethylene (HDPE) or the like. The locking member 418 is also made integrally with the covering member 416.

The locking member 418 is sized and shaped for insertion into either of the upper or the lower feed ports to secure the locking member to the reservoir side wall and maintain the desired orientation of the stem. The locking member includes an insert generally designated by reference numeral 424, that projects outwardly from the inner side 420 of the covering member 416. At least one side 426 of the insert 424 is provided with at least one raised area or bump 428. The illustrated embodiment has an insert 424 with two bumps 428 on each side 426. The bumps 428 provide a snap fit when the insert 424 is pressed into the feed ports, securing the covering member against the reservoir wall. The resistance to removal provided by the bumps is easily overcome by the user, however, when adjusting the position of the stem 400 relative to the upper and lower feed ports to change the feeding orientation being supported by the feeder.

With the locking member 418 secured to the reservoir side wall in either of the feed ports, the covering member 416 is positioned adjacent to or in abutment with the outer surface of the reservoir side wall to cover the associated feed port and prevent bird access thereto while rotation of the stem is prevented by the locking member. As described, when the stem is in a first upper feed port blocking position, the locking member is inserted into the upper feed port to secure the stem in position so that the covering member covers the upper feed port and birds can access seed only through the lower feed port by hanging upside down from the perch. Conversely, when the stem is in a second lower feed port blocking position, the locking member is inserted into the lower feed port to secure the stem with the covering element positioned over the lower feed port so that birds can access seed only through the upper feed port while standing in an upright position on the same perch.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

What is claimed is:

1. A bird feeder comprising:
    a seed reservoir having a wall with at least a first feed port and a second feed port therein through which birds can access seed held within the reservoir, said first and second feed ports being spaced apart and in generally vertical alignment with one another;
    a perch positioned adjacent the first and second feed ports and extending outwardly from the reservoir wall, said perch being fixed with respect to and supported on the reservoir wall, said perch being between, vertically aligned with, and generally equally spaced away from said first and second feed ports; and
    an adjustable port element rotatable with respect to the reservoir wall, said adjustable port element configured to rotate between a first position in which the port element allows birds to access feed through one of the first and second feed ports only while hanging upside down from the perch, and a second position in which the port element allows birds to access feed from the other of the first and second feed ports while standing in an upright position on the perch, said adjustable port element including a mounting end rotatable around said perch and a second end distal from said mounting end, said second end having a blocking structure that prevents access to said first feed port or said second feed port as the adjustable port element is rotated around the perch into one of said first and second positions.

2. The bird feeder as set forth in claim 1, wherein said adjustable port element rotates in a plane that is generally parallel with the reservoir wall.

3. The bird feeder as set forth in claim 1, wherein the blocking structure includes a covering member positioned over said feed port to be blocked and a locking member associated with said covering member, said locking member configured to be received into the feed port to be blocked and secured to the reservoir side wall, said locking member when secured within said feed port preventing rotation of said adjustable port element.

4. The bird feeder as set forth in claim 1, wherein the perch is positioned above one of the first and second feed ports, providing birds with access to seed in the reservoir when the adjustable port element is in the first position, and said perch being positioned below the other of the first and second feed ports, providing birds with access to seed in the reservoir when the adjustable port element is in the second position.

5. The bird feeder as set forth in claim 4, wherein the feed port providing birds with access to seed in the reservoir when the adjustable port element is in the first position, and the feed port providing birds with access to seed in the reservoir when the adjustable port element is in the second position are two different feed ports.

6. The bird feeder as set forth in claim 1, wherein rotating the adjustable port element between said first and second positions requires that the adjustable port element be rotated about 180 degrees.

7. A bird feeder comprising:
    a seed reservoir having a side wall with at least two feed ports therein through which birds can access seed held within the reservoir, said two feed ports being spaced apart and in generally vertical alignment with one another;

a perch extending outwardly from and supported on the reservoir wall in a fixed position relative to said wall, said perch being between, vertically aligned with, and generally equally spaced away from the two feed ports; and an adjustable port element including a mounting end rotatable around said perch and a second end distal from said mounting end, said second end having a blocking structure that prevents access to one of said two feed ports, said adjustable port element configured to rotate between a first position in which the blocking element prevents access to one of said two feed ports so that said adjustable port element allows birds to access feed through the other feed port only while hanging upside down from the perch, and a second position in which the blocking element prevents access to the other of said two feed ports so that said adjustable port element allows birds to access feed while standing right side up on the perch.

8. The bird feeder as set forth in claim 7, wherein said two feed ports, said perch and said adjustable port element form a feeding station, said bird feeder having a plurality of feeding stations spaced from one another on the reservoir side wall.

9. The bird feeder as set forth in claim 8, wherein said reservoir is an elongated cylindrical tube having a plurality of feeding stations positioned in spaced relationship from one another along and around said tube, said plurality of feeding stations including a first feeding station on a first side of the reservoir and a second feeding station on a second side of the reservoir, the second side being opposite the first side, said first and second feeding stations being in substantially horizontal alignment with one another.

10. The bird feeder as set forth in claim 9, wherein a single elongated perch member extends across an interior of the reservoir and through opposing apertures formed in the reservoir side wall, said elongated perch member having a first end protruding on the first side and a second end protruding on the second side, said first and second ends forming perches for the first and second feeding stations, respectively.

11. The bird feeder as set forth in claim 9, wherein said plurality of feeding stations includes a third feeding station and a fourth feeding station respectively positioned on opposite sides of the reservoir, said opposite sides being different from said first and second sides of the reservoir, said third and fourth feeding stations being spaced below and around the reservoir tube to be approximately 90° out from the first and second feeding stations.

* * * * *